US012238011B2

(12) United States Patent
Obradovic et al.

(10) Patent No.: US 12,238,011 B2
(45) Date of Patent: Feb. 25, 2025

(54) COMPUTER-IMPLEMENTED METHOD FOR ADAPTING AT LEAST ONE PRE-DEFINED FRAME DELAY

(71) Applicant: Siemens Aktiengesellschaft, Munich (DE)

(72) Inventors: Dragan Obradovic, Ottobrunn (DE); Günter Steindl, Poppenricht (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 335 days.

(21) Appl. No.: 17/615,849

(22) PCT Filed: Jun. 25, 2019

(86) PCT No.: PCT/EP2019/066825
§ 371 (c)(1),
(2) Date: Dec. 2, 2021

(87) PCT Pub. No.: WO2020/259808
PCT Pub. Date: Dec. 30, 2020

(65) Prior Publication Data
US 2022/0311713 A1     Sep. 29, 2022

(51) Int. Cl.
*H04L 1/00* (2006.01)
*H04L 47/283* (2022.01)
*H04L 47/32* (2022.01)

(52) U.S. Cl.
CPC ............ *H04L 47/283* (2013.01); *H04L 47/32* (2013.01)

(58) Field of Classification Search
CPC .............................. H04L 47/283; H04L 47/32
See application file for complete search history.

(56) References Cited

U.S. PATENT DOCUMENTS 6,816,496 B2 * 11/2004 Russell ................. H04J 3/1617
370/408
2005/0276223 A1    12/2005 Maggi et al.
(Continued)

FOREIGN PATENT DOCUMENTS

CN         1707988 A    12/2005
CN         108781191 A    11/2018
(Continued)

OTHER PUBLICATIONS

Nokia et al: "TSN—QoS Framework"; , 3GPP Draft; S2-188101-TSN-QOSFRAMEWORK-V2; 3rd Generation Partnership Project (3GPP); Mobile Competence Centre; 650, Route Des Lucioles ; F-06921 Sophia-Antipolis Cedex; France; vol. SA WG2; No. Sophia Antipolis; Aug. 20, 2018-Aug. 24, 2018; XP051537040; Retrieved from the Internet: URL:http://www.3gpp.org/ftp/tsg%5Fsa/WG2%5FArch/TSGS2%5F128BIS%5FSophia%5FAntipolis/Docs/S2%2D188101%2Ezip [retrieved on Aug. 14, 2018].
(Continued)

*Primary Examiner* — Abdelnabi O Musa
(74) *Attorney, Agent, or Firm* — Schmeiser, Olsen & Watts LLP

(57) ABSTRACT

Provided is a computer-implemented method for adapting at least one pre-defined frame delay, wherein the corresponding at least one frame is communicated via at least one network switch of at least one computing unit in a frame-based computer network, including the steps a. receiving input data from the at least one network switch of the at least one computing unit; wherein b. the input data includes at least one information associated with the at least one frame and/or at least one network switch; c. deriving at least one current frame delay of the at least one frame from the at least one information; d. adapting the at least one pre-defined frame delay depending on the at least one current frame delay; and e. providing the at least one adapted frame delay.

(Continued)

Figure 1:
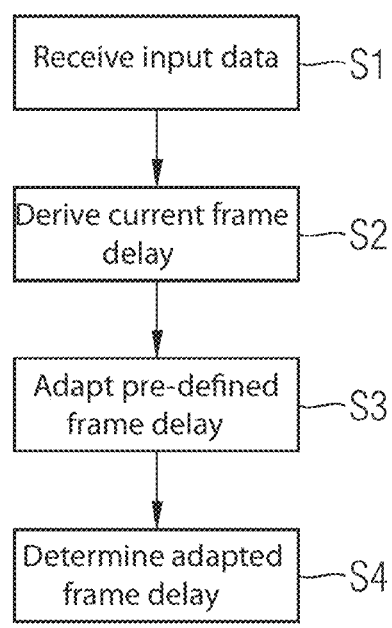

Also provided is a corresponding computer program product and monitoring unit.

9 Claims, 2 Drawing Sheets

(56) References Cited

U.S. PATENT DOCUMENTS

| | | | |
|---|---|---|---|
| 2006/0251084 A1* | 11/2006 | Elliot | H04J 3/0673 370/398 |
| 2007/0177620 A1* | 8/2007 | Ohmuro | G10L 21/04 704/E21.017 |
| 2008/0031146 A1* | 2/2008 | Kwak | H04L 43/0829 370/241.1 |
| 2010/0150154 A1* | 6/2010 | Viger | H04L 12/66 370/503 |
| 2012/0281572 A1 | 11/2012 | Lundin et al. | |
| 2017/0086250 A1* | 3/2017 | Singh | H04L 65/80 |
| 2018/0205656 A1* | 7/2018 | Atli | H04L 47/30 |
| 2019/0007344 A1* | 1/2019 | Mangin | H04L 47/6275 |
| 2019/0325882 A1* | 10/2019 | Wang | G10L 19/032 |
| 2020/0137504 A1* | 4/2020 | Shlomot | G10L 19/008 |
| 2020/0160872 A1* | 5/2020 | Shlomot | H04S 3/00 |
| 2020/0204460 A1* | 6/2020 | Schneider | H04L 43/20 |
| 2020/0213022 A1* | 7/2020 | Götz | H04J 3/0697 |

FOREIGN PATENT DOCUMENTS

| | | |
|---|---|---|
| EP | 1715607 A1 | 10/2006 |
| EP | 1004189 B1 | 4/2007 |
| EP | 1848152 A1 | 10/2007 |
| EP | 2090003 A2 | 8/2009 |
| EP | 2302845 A1 | 3/2011 |
| EP | 3396910 A1 | 10/2018 |
| WO | WO2008/024818 | 8/2009 |
| WO | WO 2018166576 A1 | 9/2018 |

OTHER PUBLICATIONS

PCT International Search Report and Written Opinion of International Searching Authority mailed Apr. 25, 2021 corresponding to PCT International Application No. PCT/EP2019/066825 filed Jun. 25, 2019.

Ali Na et al: "Online distributed statistical-delay MBAC with QoS guarantees for VPLS connections", Telecommunications, 2005. Contel 2005. Proceedings of the 8th International Conference on Zagreb, Croatia Jun. 15-17, 2005, Piscataway, NJ,IEEE, US, vol. 2, Jun. 15, 2005 (Jun. 15, 2005), pp. 383-390, XP010810355, ISBN: 978-953-184-081-1.

* cited by examiner

COMPUTER-IMPLEMENTED METHOD FOR ADAPTING AT LEAST ONE PRE-DEFINED FRAME DELAY

CROSS-REFERENCE TO RELATED APPLICATIONS

This application claims priority to PCT Application No. PCT/EP2019/066825, having a filing date of Jun. 25, 2019, the entire contents of which are hereby incorporated by reference.

FIELD OF TECHNOLOGY

The following relates to a computer-implemented method for adapting at least one pre-defined frame delay, wherein the corresponding at least one frame is communicated via at least one network switch of at least one computing unit in a frame-based computer network. Further, the following relates to a corresponding computer program product and monitoring unit.

BACKGROUND

Computer networks are known from the conventional art, according to which computing devices or units as nodes exchange data with each other using data links as connections. Local Area Networks (LANs) are computer networks which are confined to a small geographic area. LAN technologies include Ethernet, Arcnet and Token Ring. Ethernet is the most popular LAN technology in use today. The Ethernet standard is defined by the Institute for Electrical and Electronic Engineers (IEEE) as IEEE Standard 802.3. In Ethernet, a stream of data is divided into shorter pieces called frames for data transmission. Accordingly, Ethernet is a frame-based or frame-based transmission technology for the transmission of data.

Efforts are being made to provide real-time capability for standard Ethernet. One attempt is Time-Sensitive Network (TSN). TSN extends the Ethernet bridging standard according to IEEE 802.1Q. In contrast to standard Ethernet according to IEEE 802.3 and Ethernet bridging according to IEEE 802.1Q, time plays an important role in TSN to enable the real-time communication.

Figure 2:
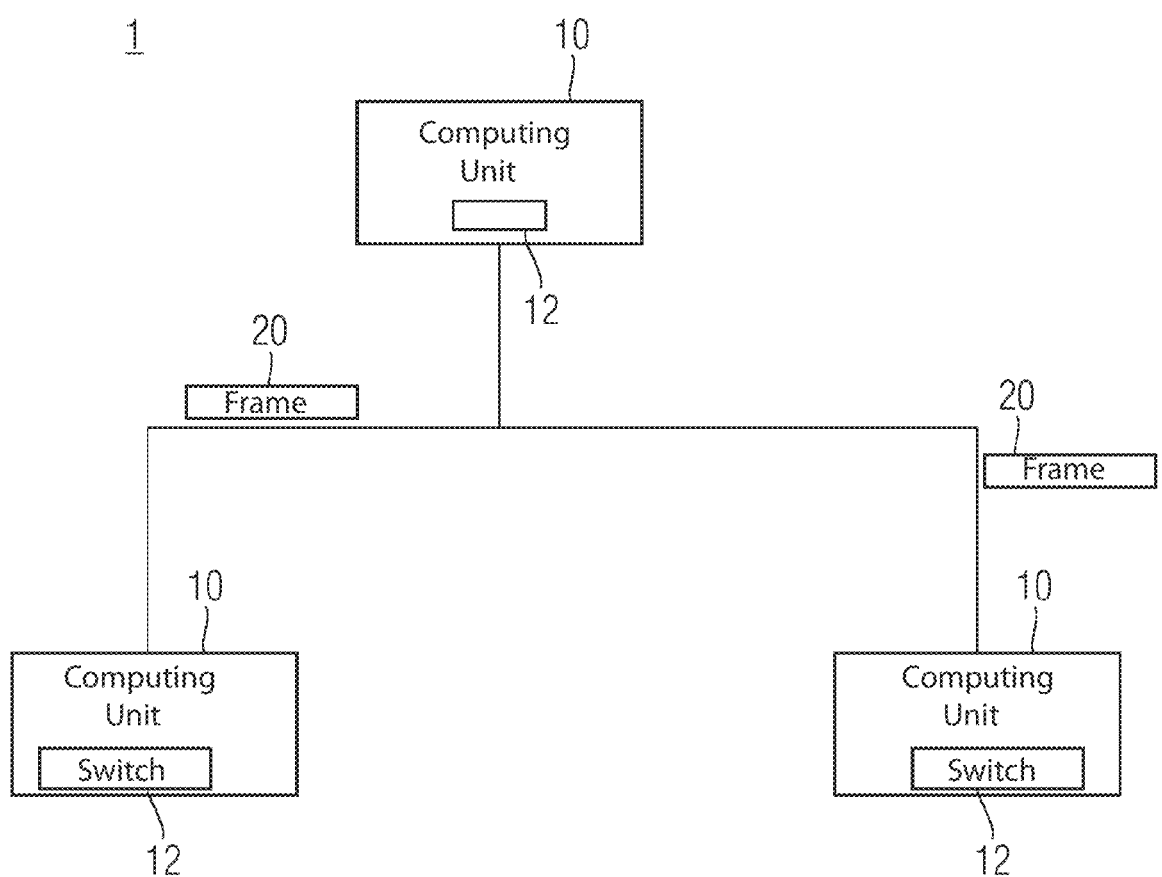

TSN provides several new features for real-time Ethernet, including time synchronization and deterministic network communication. As depicted in FIG. 2 in a simplified form, in such computer networks 1, usually, the computing units 10 do not all share one channel through a shared cable or a repeater hub; instead, each computing unit 10 communicates with a switch 12, which in turn forwards the incoming data traffic to the target computing unit 10 or destination station. Each computing unit 10 communicates only with its own switch 10, without competition for the cable with others. The computing units 10 exchange the frames 20. Regarding TSN, the switches can be referred to as TSN switches.

Usually, the planning of the data traffic in a TSN is based on a worst-case analysis of the data transmission time of the transmitted frames. This analysis is used to determine whether enough bandwidth is available for the intended frame transmission.

Thereby, the worst-case analysis typically uses the upper boundary of random frame delays, such as Bridge-Delays and/or the a priori unknown interference delays caused by different frame usages of the same communication links, i.e., same output ports in a switch. However, most of the upper boundaries and interference delays are very conservative, resulting in unnecessary reservation or resources, including the bandwidth reservation.

SUMMARY

An aspect relates to a computer-implemented method for adapting at least one pre-defined frame delay, wherein the corresponding at least one frame is communicated via at least one network switch of at least one computing unit in a frame-based computer network, in an efficient and reliable manner to improve the reservation of resources and thus data traffic capacity.

This problem is according to one aspect of embodiments of the invention solved by a computer-implemented method for adapting at least one pre-defined frame delay, wherein the corresponding at least one frame is communicated via at least one network switch of at least one computing unit in a frame-based computer network, comprising the steps:

a. Receiving input data from the at least one network switch of the at least one computing unit; wherein
b. the input data comprises at least one information associated with the at least one frame and/or at least one network switch;
c. deriving at least one current frame delay of the at least one frame from the at least one information;
d. adapting the at least one pre-defined frame delay depending on the at least one current frame delay: and
e. Providing the at least one adapted frame delay.

Accordingly, the method is directed to a computer-implemented method for adapting at least one pre-defined frame delay. The delay can be defined as delay of a frame, Which is communicated via a network switch of a computing unit in a frame-based computer network.

In other words, the frame delay is the time required to transmit a frame from one computing unit to another computing unit within the computer network. For example, the frame delay can be the sum of transmission time and other delays e.g., Bridge delay and interference delay. Additionally, or alternatively to the pre-defined frame delay, at least one a priori estimate of the maximum queue-occupancy at the output ports of switches can be adapted.

Thereby, the frame is a digital data transmission unit. In packet switched systems, a frame is a simple container for a single network packet. In an embodiment, the frame-based computer network is an Ethernet network, such as TSN, as explained in more detail further above. Alternatively, any other frame-based computer network can be used.

First, the input data is received from one or more network switches of computing units of the frame-based computer network. In an embodiment, a plurality of input data sets from different network switches of the frame-based computer network are collected and received. The input data comprises information regarding the frame and/or the respective network switch.

In other words, the network switches are extended with a monitoring or collecting capability. The network switches are able to monitor the traffic of data or data transmission. In particular, the traffic of the frames is monitored by the switches since the frames are communicated by them. The frames are received and forwarded by the network switches. Thus, for example, the time as time information as e.g., in the form of time stamps of the frames entering anchor leaving the switches can be monitored and collected. Additionally, or alternatively, the entry or sending times of frames can be monitored and collected. Additionally, or alternatively, the queue occupancy or occupancy of queues at e.g., the output ports can be checked, stored and/or forwarded. This information can be collected and stored in any kind of storage unit, e.g., database or cloud. The input data can be transmitted from the storage unit to a receiving unit.

The information is necessary to derive the current frame delay in a next step. The adapted frame delay determined by adjusting or correcting the pre defined frame delay using the current frame delay. According to which, the pre-defined underlying or associated resource reservation e.g., bandwidth is adjusted, respectively.

This adjustment can be based on one current frame delay as single value for the frame. Alternatively, the aforementioned steps can be repeated to collect a plurality of current fame delays e.g., over time for one frame for determining a normalized, mean or other statistical value as current frame delay. This way, the reliability of the current frame delay can be increased since more data is considered.

This way, the conservative or worst-case pre-defined or specified frame delay can be improved and thus the reservation of resources as well. Contrary to conventional art, the method according to embodiments of the invention is based on real data traffic.

The method according to embodiments of the invention results in an improved determination of the resource reservation, such as bandwidth in comparison to the conventional art estimation performed in the network planning phase.

Moreover, the method according to embodiments of the invention ensures an improved efficiency and accuracy since the method steps are performed by one central monitoring unit. The resulting adapted frame delay is more reliable compared to conventional art since the method does not rely on mere estimations.

In one aspect the input data is raw or processed. Accordingly, the input data can be raw data or processed input data ensuring an increased flexibility with regard to the input format.

In another aspect the information is time information of the at least one frame and/or information about a queue occupancy of a storage unit of the at least one switch, wherein the storage unit stores the at least one frame. Accordingly, any kind of information associated with the frame, network switch and/or other data communicated by the switch can be used to derive the current frame delay and check possible frame-losses. The time information can comprise time stamps, see further above. Thus, the method can be applied in a flexible manner according to the specific application case, underlying technical system and user requirements.

In another aspect the time information comprises at least two-time stamps and the at least one current frame delay is derived as the time difference between the at least two-time stamps associated the at least one frame. Accordingly, the change in time or time difference can be determined based on the time stamps.

In another aspect the at least one current frame delay is a change of the queue occupancy. Accordingly, the change of the queue occupancy can be determined.

In another aspect the adaptation is an increase or decrease of the pre-defined frame delay.

In another aspect the pre-defined frame delay is a pre-defined conservative frame delay, reflecting the worst-case scenario of the at least one frame delay.

In another aspect the adaption is a decrease of the pre-defined frame delay, if the current frame delay of the frame is below the pre-defined frame delay. Accordingly, the pre-defined frame delay or estimation of the resource reservation can be corrected in a reliable and efficient manner.

In another aspect the method further comprises at least one step selected from the group, comprising:
  outputting the adapted frame delay to a user for further evaluation;
  displaying the adapted frame delay to a user for further evaluation, and
  transmitting the adapted frame delay to a computing unit for further evaluation, and
  applying the adapted frame delay on the at least one computing unit, frame-based computer network or other units of the frame-based computer network.

Accordingly, the adapted frame delay as output data, data of intermediate method steps and/or any other related information can be further handled or processed. One or more actions can be performed. The action can be equally referred to as measure or further method step. The actions can be triggered depending on the user knowledge, evaluation by the user or any other criteria. The actions can be performed sequentially or simultaneously. Actions include e.g. storing and processing steps. The advantage is that appropriate actions can be performed in a timely manner. For example, the determined adapted frame delay can be applied on the computer units of the network to set or implement the according resource reservation.

For example, in one exemplary use case, the method according to embodiments of the invention can be used to check whether additional frames can be sent in the same cycle. Maybe with the previous very conservative values it looked not possible, but the method results in reduced estimates and hence additional frames.

A further aspect of embodiments of the invention is a computer program product (non-transitory computer readable storage medium having instructions, which when executed by a processor, perform actions) directly loadable into an internal memory of a computer, comprising software code portions for performing the steps according to any one of the preceding claims when the computer program product is running on a computer.

A further aspect of embodiments of the invention is a monitoring unit.

The units may be realized as any devices, or any means, for computing, in particular for executing a software, an app, or an algorithm. For example, the monitoring unit may comprise a central processing unit (CPU) and a memory operatively connected to the CPU. The monitoring unit may also comprise an array of CPUs, an array of graphical processing units (GPUs), at least one application-specific integrated circuit (ASIC), at least one field-programmable gate array, or any combination of the foregoing. The units may comprise at least one module which in turn may comprise software and/or hardware. Some, or even all, modules of the units may be implemented by a cloud computing platform.

In an embodiment, the monitoring unit is a network controller.

BRIEF DESCRIPTION

Some of the embodiments will be described in detail, with reference to the following figures, wherein like designations denote like members, wherein:
  FIG. 1 illustrates a flowchart of the method according to embodiments of the invention; and
  FIG. 2 illustrates an exemplary frame-based computer network according to conventional art.

DETAILED DESCRIPTION

FIG. 1 illustrates a flowchart of the method according to embodiments of the invention with the method steps S1 to S4. The method steps are performed by a monitoring unit (not shown). According to an embodiment of the invention, the monitoring unit is a network controller.

The network controller receives the input data with the information associated with the frame 20 and/or network switch 12 of the computing unit 10, S1.

The information can be time based, if the time information is available. Additionally, or alternatively, the information can be based on the correlation between the traffic of the frames 20 at the input ports and the changes in the occupancy of the appropriate queues of the frames at the output ports. This information is essential for the further method steps S2 to S4, and thus to determine whether the pre-defined frame delay is correctly specified or rather in other words, whether the worst-case frame interference really takes place or not. The pre-defined frame delay and thus estimation of the resource reservation is corrected in step d. depending on the information.

This way, the estimation of the resource reservation can be improved allowing for increased or additional data traffic. In other words, the traffic capacity is significantly improved within the frame-based computer network.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE SIGNS 1 network
20 computing unit or computing device
12 network switch
20 frame
S1 to S4 method steps S1 to S4

The invention claimed is:

1. A computer-implemented method for adapting at least one pre-defined frame delay, wherein a corresponding at least one frame is communicated via at least one network switch of at least one computing unit in a frame-based computer network, and the at least one frame is received and forwarded by the at least one network switch which is extended with a monitoring or collecting capability, further wherein a traffic of the at least one frame is monitored by the at least one network switch, and the at least one pre-defined frame delay is an underlying or an associated resource reservation, the method comprising:

a. monitoring and collecting input data from the at least one network switch of the at least one computing unit; wherein:
　b. the input data comprises at least one information associated with a queue occupancy of a storage unit of the at least one network switch, wherein the storage unit stores the at least one frame;
　c. deriving at least one current frame delay of the at least one frame from the at least one information, wherein the at least one current frame delay is a change of the queue occupancy;
　d. collecting a plurality of current frame delays over time for one frame to determine a statistical value of a current frame delay;
　e. determining the at least one adapted frame delay by adjusting or correcting the at least one pre-defined frame delay using the statistical value of the current frame delay.

2. The method according to claim 1, wherein the input data is raw or processed.

3. The method according to claim 1, wherein the adaptation is an increase or decrease of the pre-defined frame delay.

4. The method according to claim 3, wherein the adaption is a decrease of the pre-defined frame delay, if the current frame delay of the frame is below the pre-defined frame delay.

5. The method according to claim 1, wherein the pre-defined frame delay is a predefined conservative frame delay, reflecting the worst-case scenario of the at least one frame delay.

6. The method according to claim 1, wherein the method further comprises at least one step selected from the group, comprising:
　outputting the adapted frame delay to a user for further evaluation;
　displaying the adapted frame delay to a user for further evaluation;
　transmitting the adapted frame delay to a computing unit for further evaluation, and
　applying the adapted frame delay on the at least one computing unit, frame-based computer network or other units of the frame-based computer network.

7. A computer program product, comprising a computer readable hardware storage device having computer readable program code stored therein, said program code executable by a processor of a computer system to implement the method according to claim 1 when the computer program product is running on a computer.

8. A monitoring unit for performing the method according to claim 1.

9. The monitoring unit according to claim 8, wherein the monitoring unit is a network controller of the frame-based computer network.

* * * * *